(12) United States Patent
Jokinen

(10) Patent No.: US 9,638,444 B2
(45) Date of Patent: May 2, 2017

(54) FILTER LESS A/C SYSTEM

(71) Applicant: Teppo Kullervo Jokinen, Pembroke Pines, FL (US)

(72) Inventor: Teppo Kullervo Jokinen, Pembroke Pines, FL (US)

( * ) Notice: Subject to any disclaimer, the term of this patent is extended or adjusted under 35 U.S.C. 154(b) by 0 days.

(21) Appl. No.: 14/121,898

(22) Filed: Nov. 1, 2014

(65) Prior Publication Data
US 2016/0123643 A1 May 5, 2016

(51) Int. Cl.
| | |
|---|---|
| F24F 3/00 | (2006.01) |
| F25B 27/00 | (2006.01) |
| F25B 1/10 | (2006.01) |
| F25B 43/00 | (2006.01) |
| F24F 5/00 | (2006.01) |
| F24F 3/16 | (2006.01) |
| F25B 39/04 | (2006.01) |
| F28F 17/00 | (2006.01) |
| F28F 19/00 | (2006.01) |
| F28F 1/32 | (2006.01) |
| F28D 21/00 | (2006.01) |

(52) U.S. Cl.
CPC .............. *F25B 39/04* (2013.01); *F28F 1/32* (2013.01); *F28F 17/00* (2013.01); *F28F 19/00* (2013.01); *F25B 2600/111* (2013.01); *F25B 2700/2116* (2013.01); *F28D 2021/0068* (2013.01); *F28F 2265/20* (2013.01); *Y02B 30/743* (2013.01)

(58) Field of Classification Search
CPC ...... F24F 1/022; F24F 5/00; F24F 2011/0006; F24F 3/1603; F24F 43/003; B01D 53/265

USPC ....... 4/218; 236/49.3, 44 C; 62/507, 508, 93
See application file for complete search history.

(56) References Cited

U.S. PATENT DOCUMENTS

| | | | | |
|---|---|---|---|---|
| 4,208,572 | A * | 6/1980 | Melgaard ................. | F27D 7/00 165/169 |
| 7,193,188 | B2 * | 3/2007 | Korecki ............. | G05D 23/1913 219/491 |
| 2006/0086716 | A1* | 4/2006 | Korecki ............. | G05D 23/1913 219/507 |
| 2008/0098761 | A1* | 5/2008 | Zangari ................. | A47F 3/0408 62/249 |
| 2009/0188027 | A1* | 7/2009 | Katsumi ................. | F24F 1/022 4/218 |
| 2010/0175400 | A1* | 7/2010 | Kasahara ................. | F25B 1/10 62/225 |
| 2012/0266620 | A1* | 10/2012 | Bernardi ............... | F25B 49/005 62/126 |
| 2013/0312447 | A1* | 11/2013 | Inaba ....................... | F25B 43/00 62/324.6 |
| 2014/0165633 | A1* | 6/2014 | De Piero ............... | F24F 3/1405 62/93 |

(Continued)

*Primary Examiner* — Frantz Jules
*Assistant Examiner* — Meraj A Shaikh
(74) *Attorney, Agent, or Firm* — Lev Ivan Gabriel Iwashko

(57) ABSTRACT

A low temperature Freon, where indoor air in an air handling unit goes through an indoor coil. Do to the fact that indoor coil fins' surface temperature is below freezing, ice will build up on surfaces of the fins, icy/wet surfaces will catch foreign substances from the air. Air in the center of indoor coil is passing through without cooling the indoor air. Mixture of the cooled and the by passed air are resulting pleasant and clean indoor air. Temperature sensors installed on surfaces of indoor coils opens and closes according to set temperature, turning blower motor on and off.

12 Claims, 5 Drawing Sheets

(56) References Cited

U.S. PATENT DOCUMENTS

2014/0250941 A1* 9/2014 Steele ................... F25B 27/00
                                                            62/323.1
2015/0191305 A1* 7/2015 Ueno ................... B65D 88/744
                                                            62/455

* cited by examiner

FIG. 5
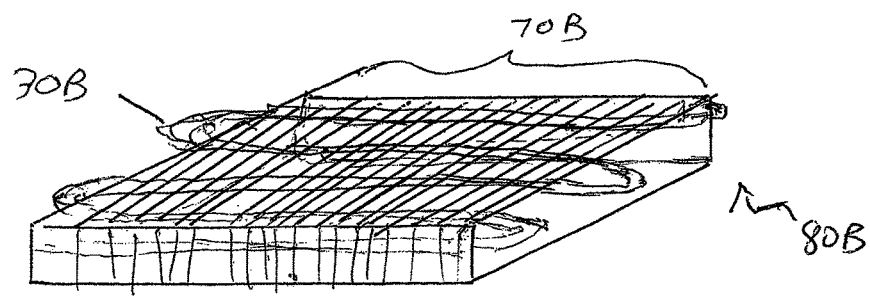
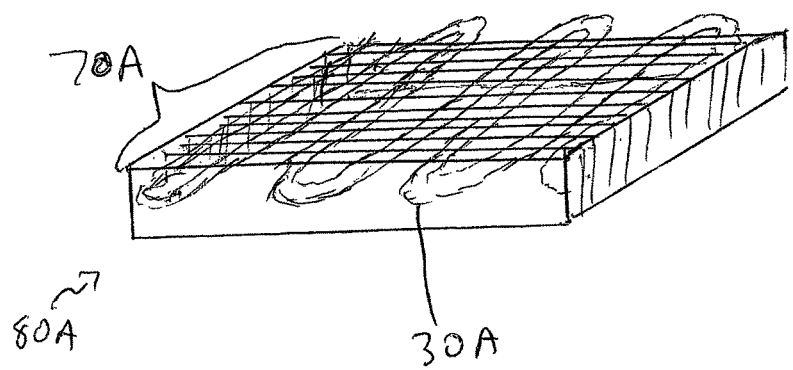

FILTER LESS A/C SYSTEM

BACKGROUND OF THE INVENTIVE CONCEPT

1. Field of the Inventive Concept

The present general inventive concept relates generally to the field of air conditioning and more specifically, to an apparatus to improve air quality by, for example, removing bacteria molecules from the air.

2. Description of the Related Art

At the present time, Super Bugs in hospitals kill approximately 100,000 patient annually at the expense of $30 Billion per year.

Historically, indoor air passing through a conventional air conditioner has been cleaned by filters (i.e., a filter is an apparatus, used for catching foreign substances, such as dust, bacteria, etc.).

As such, every air conditioning unit connected to a return duct system requires a filter.

Under ordinary conditioning and circumstances, conventional air conditioning systems are using mechanical or electronic filters.

Filters are used to protect a coil assembly, to prevent air openings in the coil from being blocked, and also to remove foreign objects from indoor air.

At the present time every air conditioning is equipped with some kind of filtering apparatus.

These type filters are very expensive, need to be replaced frequently, and will not catch every particle of smoke, odor, bacteria molecules or other types of substances.

SUMMARY OF THE INVENTIVE CONCEPT

The present general inventive concept includes an A/C system that applies a low temperature system Freon and includes a special coil design, wherein the term special coil design denotes that the coils and fins may be disposed within the A/C system using various configurations not obvious to one of ordinary skill in the art, such as the coils and fins being disposed in various different directions and orientations relative to each other. The term "special coil design" denotes that the coils and fins may be disposed within the A/C system using various configurations not obvious to one of ordinary skill in the art, such as the coils and fins being disposed in various different directions and orientations relative to each other.

Due to the fact that coil surface temperatures is below freezing point, moisture in the supply air will condensate and freeze as ice on the surfaces of coil assembly. Foreign substances (dust, hair, smoke, bacteria molecules, etc.) will get trapped on icy surfaces of the coil assembly.

When A/C system is on off cycle, ice will be separated from fins and it will drop down to drain pan with foreign substances, melt and drain outside the A/C system to a designated area.

The fins are assembled in a such of manner that air temperature next to fins are below freezing and at the center of fins are at the indoor temperatures. Thus, exiting air is mixed with cold and indoor air, thereby causing temperatures leaving the coil assembly to be at acceptable temperatures at the supply air outlet.

BRIEF DESCRIPTION OF THE DRAWINGS

FIG. 5 is a view illustrating two sets of coils with varying orientations.

DETAILED DESCRIPTION OF THE DRAWINGS

Figure 1:
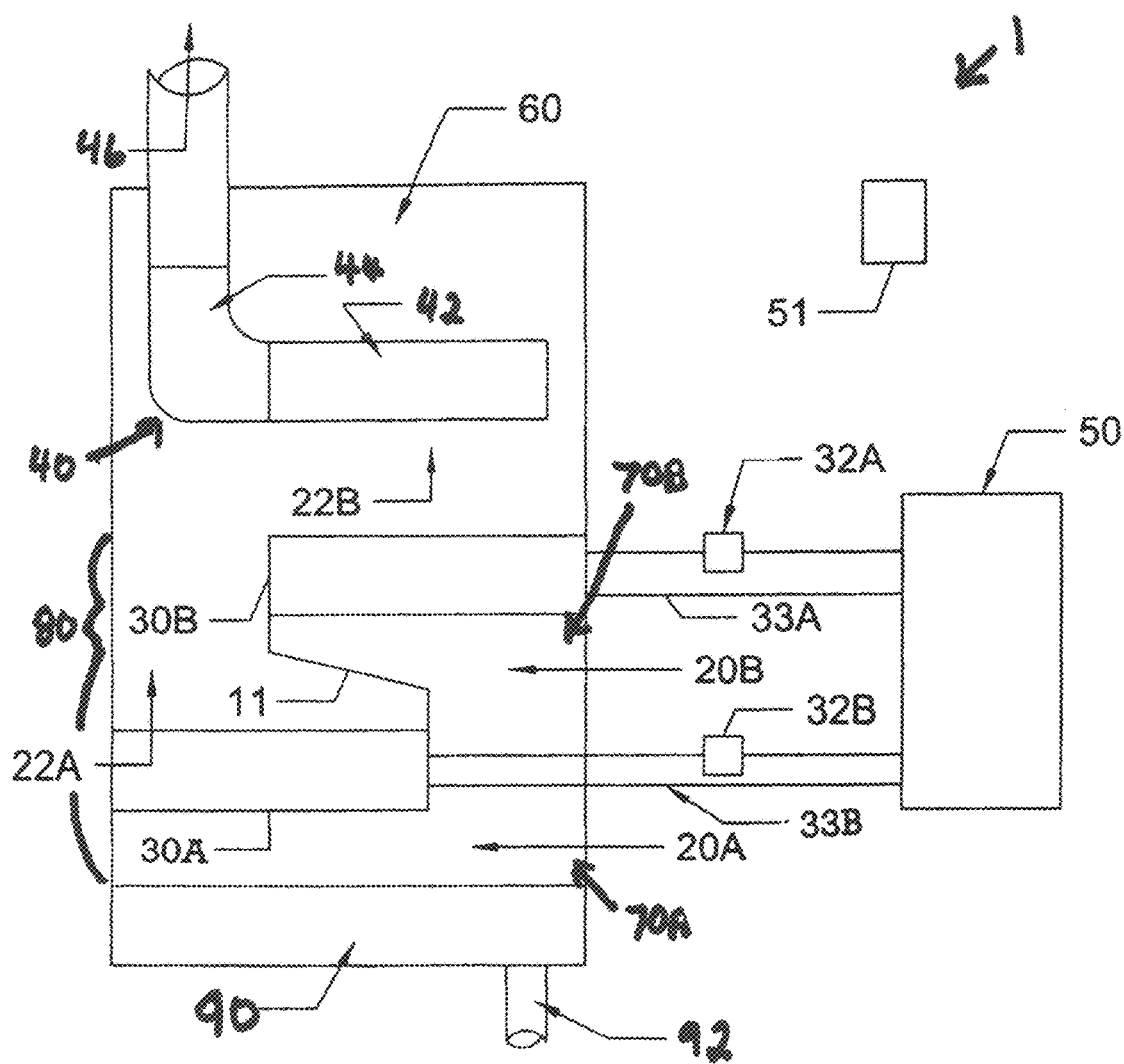
FIG. 1 is a side view of a filter less air conditioning system.

The drawings constitute a part of this specification and include exemplary embodiments of the present general inventive concept, which may be embodied in various forms. It is to be understood that in some instances various aspects of the present general inventive concept may be shown exaggerated or enlarged to facilitate an understanding of the present general inventive concept.

FIG. 1A is a side view of a filter less air conditioning system (1).

The filter less air conditioning system (1) may include a condensing unit (a.k.a., condenser) (50), an indoor climate control unit (51), and an air handing unit (60).

The indoor climate control unit (51) may include a thermostat or any other device to regulate a temperature of a room as desired by a user. The indoor climate control unit (51) may be controlled by the user to regulate a temperature of a room, for example, and is connected electrically to the condenser (50) in order to turn the condenser (50) on and/or off.

The AHU (60) may include a coil assembly (80) and an air distribution system (40).

The AHU (60) may be connected to the condenser (50) via a set of pipes (33A) and (33B). Each of the pipes (33A) and (33B) has a metering device (32A) and (32B), respectively, to regulate proper refrigerant flow from the condenser (50) to the AHU (60).

The coil assembly (80) may include indoor coils (a.k.a., coils) (30A) and (30B) and fins (70A) and (70B).

Indoor air (20A) and (20B) enters into the indoor coils (a.k.a., coils) (30A) and (30B). Liquid refrigerant may flow from the condensing unit (50) through the pipes (32A) and (33B) into coils (30A) and (30B), respectively. The liquid refrigerant will evaporate, causing temperature of the coils (30A) and (30B) to change to below freezing.

As the indoor air (20A) and (20B) passes through the coils (30A) and (30B), a heat exchanger within the condenser (50) may lose heat energy, thereby reducing the temperature of the coils (30A) and (30B), and causing steam in the air to turn into ice on surfaces of the fins (70A) and (70B). As a result, dust, bacteria, and other pollutants will bond onto the surface of the fins (70A) and (70B).

A deviate (a.k.a., divider) (11) separates the indoor air (20A) and (20B) separated from treated air (22A) and (22B).

The air distribution system 40 may include a blower (42), a ducting (a.k.a., duct work) (44), and an outlet (46).

Furthermore, the treated air (22A) and (22B) (e.g., clean cold air or clean warm air) will be transferred into the duct work (44) by the blower (42).

The blower (42) may include a fan motor to cause the clean cold air, for example, to be transferred into the air distribution system (40).

The cold clear air may be output to outside the AHU (60) by travelling from the blower (42) through the duct work (44), and then outside via the outlet (46).

At a bottom portion of the AHU (60), a drain a pan (42B) may be used to collect condensate water and ice. More specifically, as Condensate water, ice, dust, bacteria and other pollutants may drop into a drain pan (90) and run out of the AHU (60) through a drain pipe (92).

Figure 2:
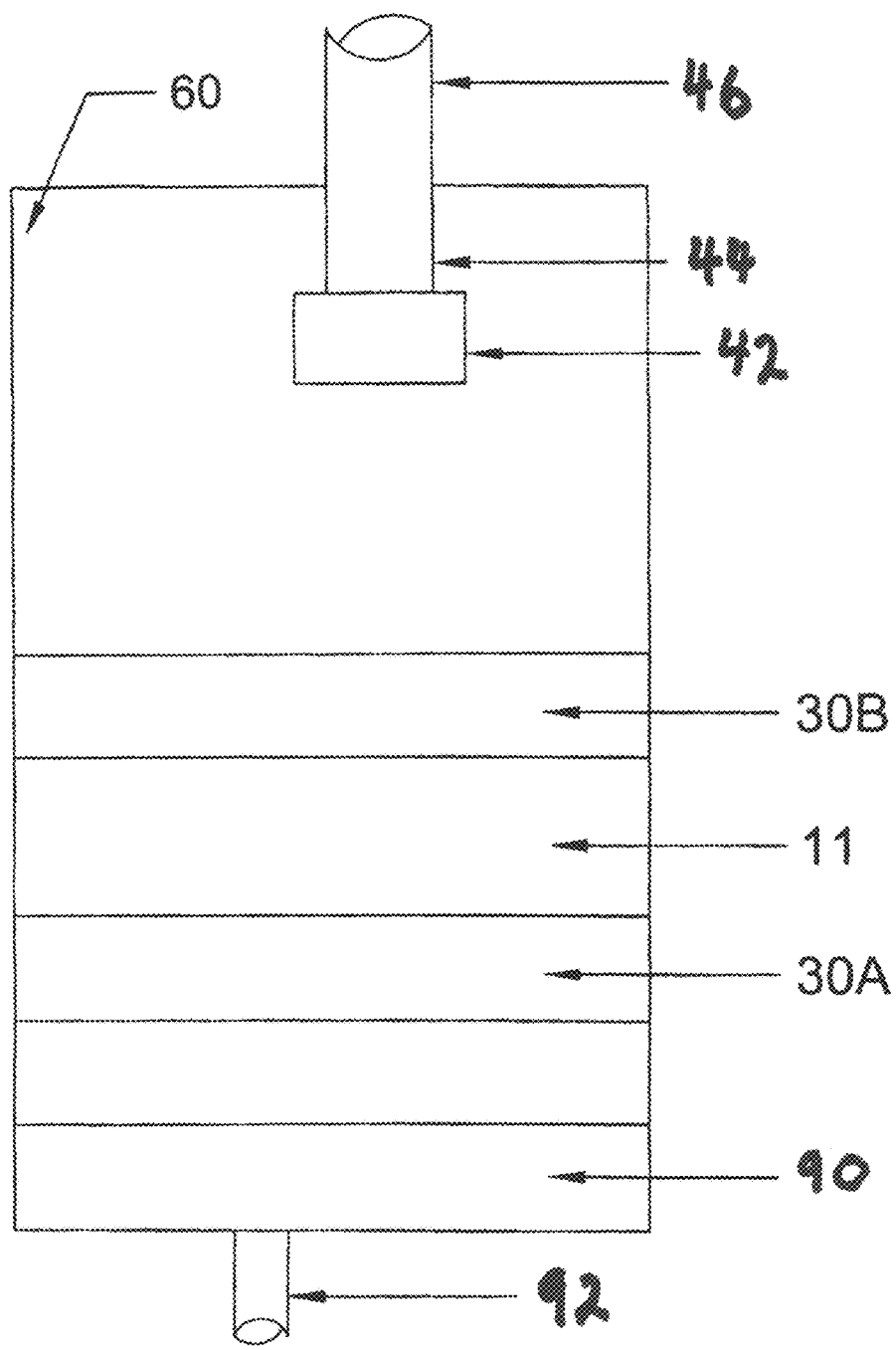
FIG. 2 is a front view illustrating an air handling unit (AHU)

FIG. 2 is a front view illustrating the AHU (60). The divider (11) is a divider between the coils (30A) and (30B). A number of coils in the AHU (60) may include 1, 2, or N coils.

As illustrated in FIG. 2, a top portion of the AHU (60) includes a fan blower system including the blower 42 to transfer clean cool air or clean warm air through the air distribution system 40.

A bottom portion of the AHU (60) includes the drain pan (90) to catch water and ice, and the outlet (92) to expel the water and ice outside the AHU (60).

Figure 3:
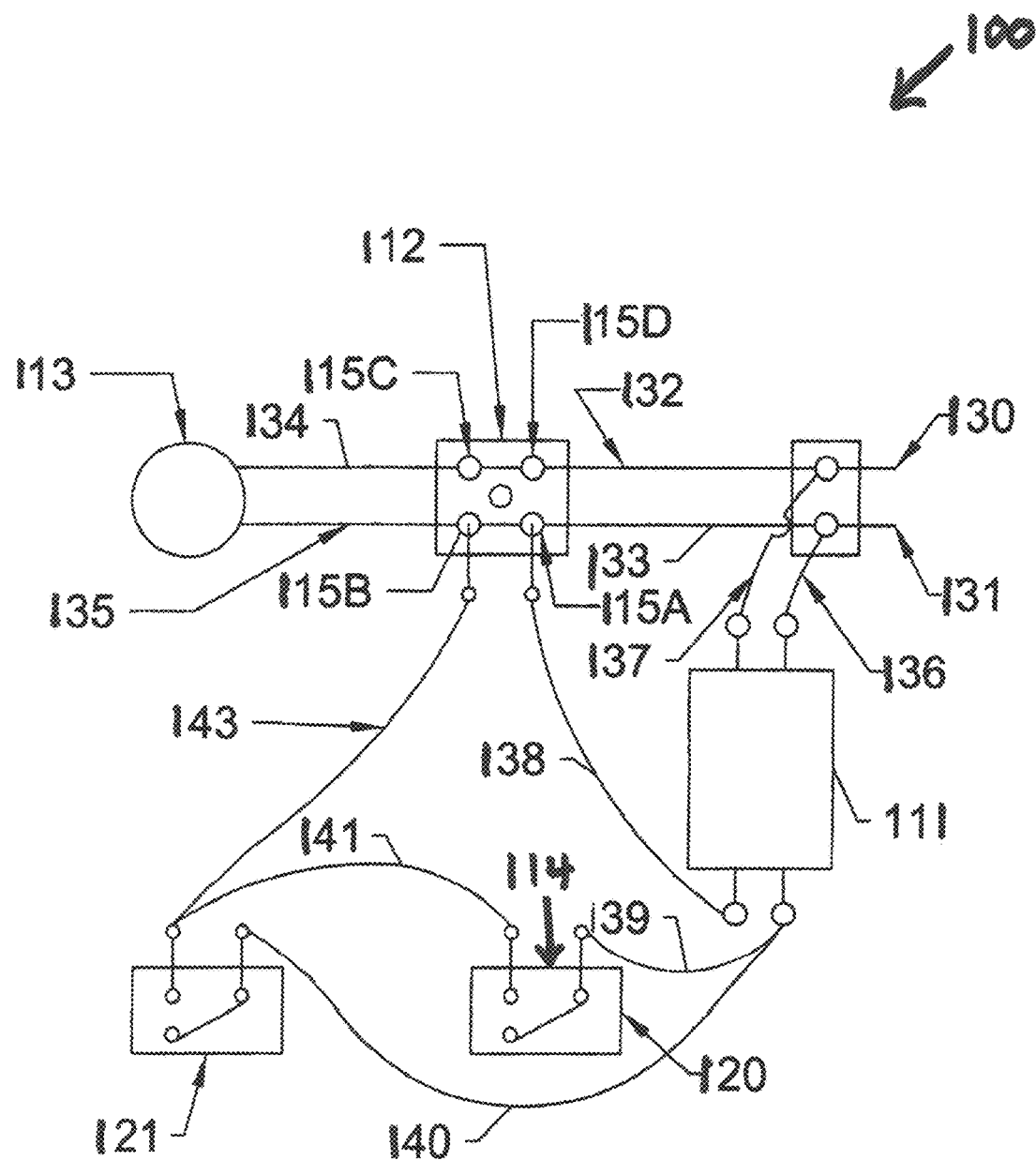
FIG. 3 is a cross sectional view illustrating a controlling system.

FIG. 3 is a cross sectional view illustrating a controlling system (a.k.a., a controller) 100.

A power source (130) and (131), such as a 250 VAC, connected via wires (132) and (133) to a contactor solenoid (112), and connected via wires (136) and (137) to a transformer (111).

Bimetal sensors (120) and (121), when in a closed position, will turn the blower (42) on, according to a setting of sensors (120) and (121).

Referring to FIGS. 1 through 3, a Cooling Cycle of the filter less air conditioning system 1 will be herein described.

When a temperature of the coils (30A) and (30B) is below the freezing point, a contact of the sensor (120) closes, and current flows to contactor solenoid (114) through wires (139), (141), (143) and a neutral wire (138). The contactor solenoid (114) will pull contactors (115A), (115B), (115C) and (115D) together closing contacts between the power sources (130) and (131), and a blower motor (113) of the blower (42) of FIG. 1 via wires (134) and (135), causing the blower motor (113) to start.

Referring to FIGS. 1 through 3, a Heating Cycle of the filter less air conditioning system 1 will be herein described.

Referring to FIGS. 1 and 3, when an indoor temperature is below a setting of a thermostat, such as the indoor climate control unit 51, the condenser (50) will start a heating cycle. When coil temperature is above a predetermined setting of the sensor (121), current flows to the contactor solenoid (112) through hot wires (140) and (143), and the neutral wire (138). The contactor solenoid 112 will pull contactors (115A), (115B), (115C) and (115D) together to close a contact between the power sources (130) and (131), and the blower motor (113) of the blower (42) of FIG. 1 via the wires (134) and (135), causing the blower motor (113) to start.

When a temperature of the coils (30A) and (30B) is outside of a pre-selected temperature, the blower motor (113) is off.

Figure 4:
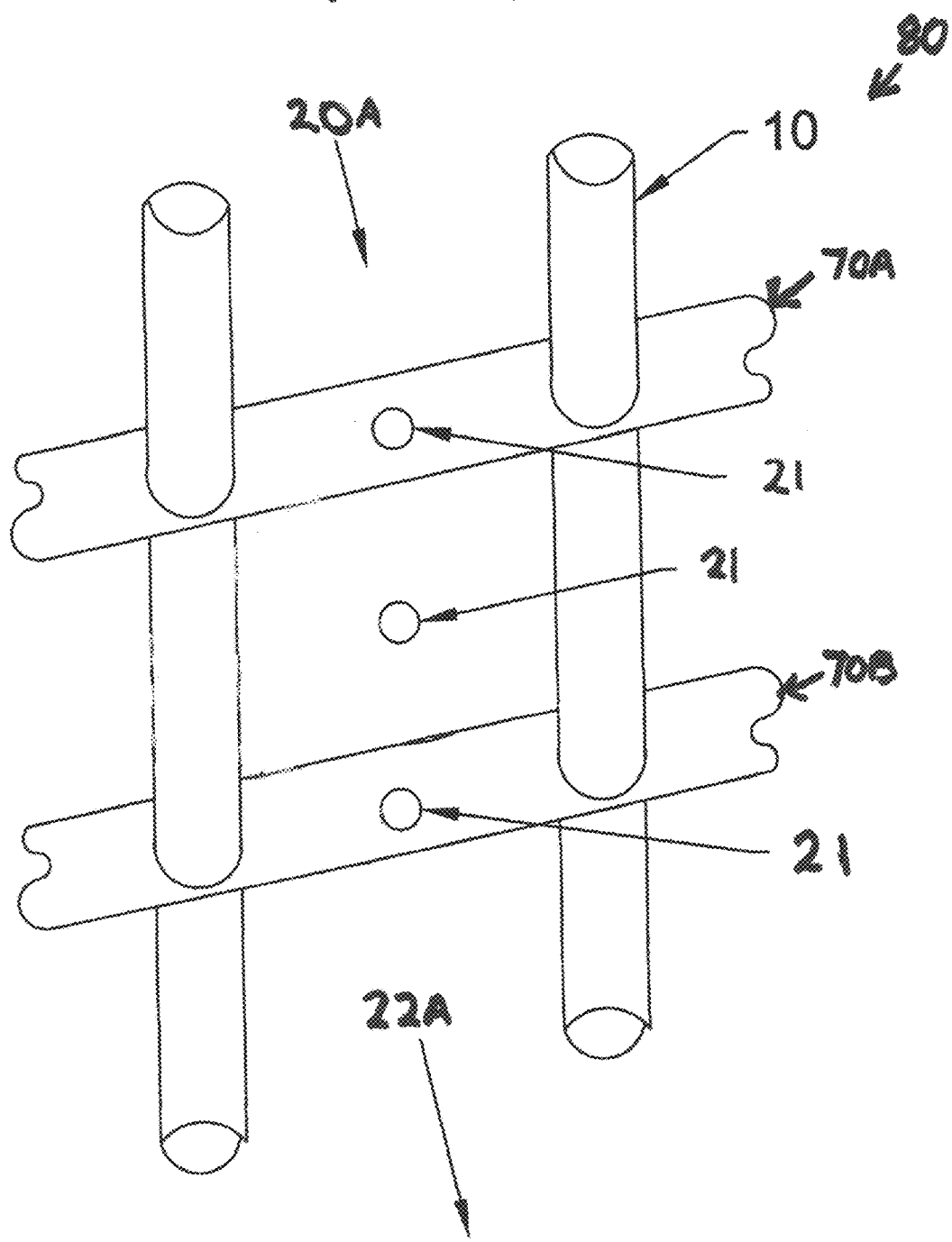
FIG. 4 is a view illustrating details of a coil assembly.

FIG. 4 is a view illustrating details of the coil assembly 80.

Tubing (10) runs through fins (70A) and (70B). Indoor air (30) passes through the coil assembly (80). Steam in the air next to the fins (70A) and (70B) will condensate and form into ice on the fins (70A) and (70B), and dust, bacteria and other pollutants will bond onto the cold fins (70A) and (70B). Treated air (22A) and (22B) exit the coil assembly (80).

Referring to FIGS. 1 through 4, the blower (42) will carry cooled and cleansed air through the duct work (44) and the outlet (46). As stated above, the divider (11) is a divider between the indoor coils (30A) and (30B).

FIG. 5 is a view illustrating two sets of coils of a coil assembly 80, according to an exemplary embodiment of the present general inventive concept. As denoted above, the following description illustrates the "special coil design."

A first set of coils (80A) comprises the coil (30A) and the fins (70A), but is not limited thereto. A second set of coils (80B) comprises the coil (30B) and the fins (70B), but is not limited thereto. A space between the first set of coils (80A) and the second set of coils (80B) is extremely cold, as the lower temperature refrigerant of the coil (30A) and the coil (30B) will cause the space to be super-chilled.

Referring to FIGS. 1 through 5, when the condenser (50) is running, the temperature of the coils (30A) and (30B) may be below a freezing point. When the warm indoor air (20A), for example, enters into the AHU (60), water vapor, dust, bacteria and other pollutants, identified herein as debris (21), will bond (a.k.a., freeze) to the surface of the fins (70A) and (70B).

More specifically, as the air that contains the debris (21) passes through the first set of coils (80A), the first set of coils (80A) causes the debris (21) to freeze and bond to the fins (70A). As stated above, the space between the first set of coils (80A) and second set of coils (80A) and (80B) will be very cold, because both the first set of coils (80A) and the second set of coils (80B) are cooled by a lower temperature refrigerant. Therefore, as the air continues to pass through the first set of coils (80A) toward the second set of coils (80B), any potential leftover debris (21) that is not already frozen and bonded to the first set of coils (80A) will be further chilled, such that the debris (21) easily bonds and freezes to the fins (70B) of the second set of coils (80B).

Furthermore, some of the leftover debris (21) may fall back toward the first set of coils (80A) to be bonded and frozen to the first set of coils (80A), since the chilling effect of the space between the first set of coils (80A) and the second set of coils (80B) will cause the debris (21) to accumulate weight due to freezing of the condensation, on the debris (21), from the first set of coils (80A).

When the air conditioning unit stops operating, the temperature on the fins (70A) and (70B) will rise above the freezing point causing the ice to melt, break apart, and fall, along with the debris (21), on to the drain pan (90). As a result, the treated air (22A) is output from the AHU (60), resulting in clean cool indoor air for the user to breathe. In other words, foreign substances such as dust, hair, smoke, bacteria molecules have been removed from the indoor air (20A).

The present general inventive concept includes an A/C system that applies low temperature Freon to a special evaporator coil design.

Foreign substances (dust, hair, smoke, bacteria, and any other substances in the air passing through the coil) will get stuck on icy surface of the coil (i.e., coil assembly).

More specifically, debris sticks to at least a center portion of fins of the coil as indoor air passes through the fins. As a result, no filter is needed to produce practically clean indoor air. The present general inventive concept is estimated to save over 1,000,000 lives over a 10 year period, along with medical expenses of over $300 Billion.

I claim:

1. A filter less A/C system, comprising:
 a condenser to contain and output a lower temperature refrigerant; and
 an air intake comprising a coil assembly to receive the lower temperature refrigerant from the condenser such that debris in air surrounding the coil assembly freeze and bond to the coil assembly as the air enters the and passes through the coil assembly from outside the filter less A/C system, such that clean air without the debris is output from the filter less A/C system, the coil assembly comprising: a first set of coils disposed in a first direction to catch the debris from the air, and to freeze and bond the debris on to the first set of coils, and a second set of coils disposed directly above the first set of coils in a second direction parallel to the first direction to catch leftover debris in the air that passes through the first set of coils and is not caught by the first set of coils, and to freeze and bond the leftover debris to the first set of coils such that clean air without the debris is output from the filter less A/C system, the coil assembly comprising:
- a first set of coils disposed in a first direction to catch the debris from the air, and to freeze and bond the debris to the first set of coils, and
- a second set of coils disposed directly above the first set of coils in a second direction parallel to the first direction to catch leftover debris in the air that passes through the first set of coils and is not caught by the first set of coils, and to freeze and bond the leftover debris to the first set of coils.

2. The filter less A/C system of claim 1, further comprising:
- a drain pan to collect the objects bonded to the coil assembly in response to the coil assembly becoming warmer.

3. The filter less A/C system of claim 1, further comprising:
- a blower to direct the air to flow through the coil assembly and then through the blower when the blower is on; and
- a controller to control the blower based on a comparison between a temperature of the coil assembly and one of a predetermined low temperature and a predetermined high temperature.

4. The filter less A/C system of claim 3, wherein the controller comprises:
- a low temperature sensor to sense a low temperature of the coil assembly;
- a first contactor connected to the low temperature sensor to turn the blower on when the sensed low temperature of the coil assembly reaches the predetermined low temperature;
- a high temperature sensor to sense a high temperature of the coil assembly; and
- a second contactor connected to the low temperature sensor to turn the blower on when the sensed high temperature of the coil assembly reaches the predetermined high temperature.

5. The filter less A/C system of claim 4, wherein:
- during a cooling mode, the blower is turned off when a predetermined low temperature outside the filter less A/C system is reached; and
- during a heating mode, the blower is turned off when a predetermined high temperature outside the filter less A/C system is reached.

6. The filter less A/C system, comprising:
- a condenser to output a lower temperature refrigerant during a cooling mode and to output hot gas during a heating mode;
- an air intake comprising a coil assembly to receive the lower temperature refrigerant during the cooling mode and to receive the hot gas during the heating mode such that debris in air from outside the filter less A/C system freeze to the coil assembly as the debris passes through the coil assembly during the cooling mode, the coil assembly comprising; a first set of coils disposed in a first direction to catch the debris from the air, and to freeze and bond the debris on to the first set of coils, and a second set of coils disposed directly above the first set of coils in a second direction parallel to the first direction to catch leftover debris in the air that passes through the first set of coils and is not caught by the first set of coils, and to freeze and bond the leftover debris to the first set of coils; such that debris in air from outside the filter less A/C system freeze to the coil assembly as the debris passes through the coil assembly during the cooling mode, the coil assembly comprising:
  - a first set of coils disposed in a first direction to catch the debris from the air, and to freeze and bond the debris to the first set of coils, and
  - a second set of coils disposed directly above the first set of coils in a second direction parallel to the first direction to catch leftover debris in the air that passes through the first set of coils and is not caught by the first set of coils, and to freeze and bond the leftover debris to the first set of coils;
- a blower to direct air from outside the filter less A/C system through the coil assembly such that cooled air or heated air is blown out of the filter less A/C system based on a selected one of the cooling mode or the heating mode; and
- a sensor to turn the blower on or off based on at least one of a temperature of the coil assembly and a temperature outside the filter less A/C system, depending on the selected one of the cooling mode and the heating mode.

7. The filter less A/C system of claim 6, further comprising:
- a drain pan to collect the objects frozen to the coil assembly in response to the coil assembly becoming warmer.

8. The filter less A/C system of claim 7, wherein the coil assembly becomes warmer in response to the condenser turning off based on the temperature outside the filter less A/C system reaching a predetermined low temperature.

9. The filter less A/C system claim 6, wherein the low temperature refrigerant causes a layer of ice including particles and bacteria to form on a surface of the coil assembly.

10. The filter less A/C system claim 7, wherein the drain pan comprises:
- an opening on a bottom portion of the drain pan to allow water to flow into a drain system piping to expel the water outside of a building.

11. The filter less A/C system of claim 9, wherein the condenser turns off based on the temperature outside the filter less A/C system reaching a predetermined temperature.

12. The filter less A/C system claim 10, further comprising:
- a drain pan to collect the ice as it separates from the coil assembly in response to the condenser turning off and stopping the output of the lower temperature refrigerant to the coil assembly.

* * * * *